Patented Feb. 9, 1937

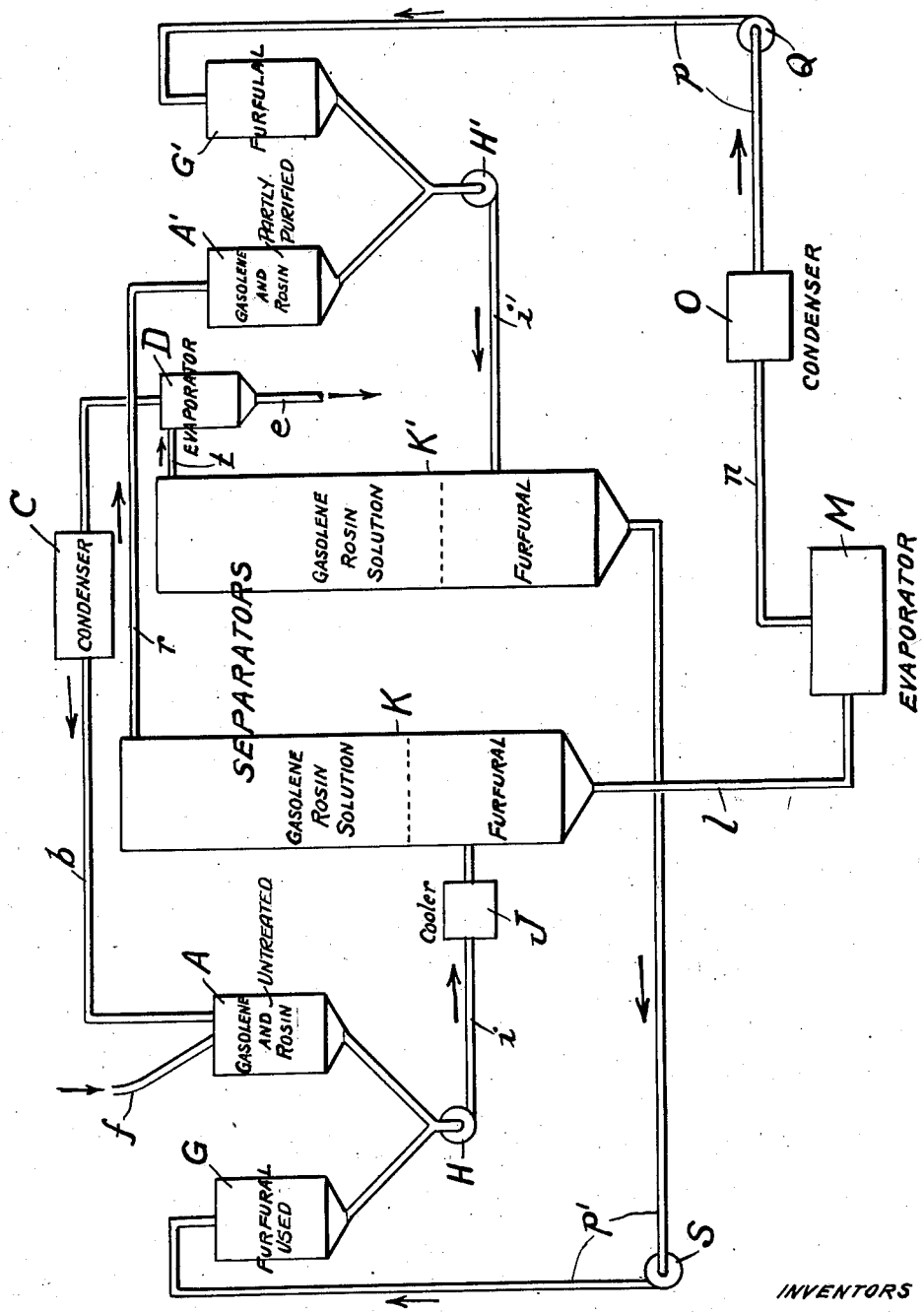

2,070,125

UNITED STATES PATENT OFFICE 2,070,125

APPARATUS FOR REFINING ROSIN

Roy S. Hancock, Kenvil, N. J., and Arthur Langmeier, Wilmington, Del., assignors to Hercules Powder Company, Wilmington, Del., a corporation of Delaware Application January 14, 1931, Serial No. 508,690

3 Claims. (Cl. 87—2)

This invention relates to an improvement in method and apparatus for the refining of rosin.

As is well known, wood rosin such as is obtained by extraction from, for example, pine stump wood, is normally dark in color and additionally contains substances termed by us "latent color bodies", which while normally colorless, tend to darken under certain conditions as, for example, in the presence of air and an alkali and the presence of which negative the use of wood rosin in the preparation, for example, of soaps, limed varnishes, sizes, etc., where such products are required to have and maintain a light color. Normally gum rosin, which, as is well known, is obtained from live pine trees, for example, by bleeding, is light in color. However, under certain conditions gum rosin as obtained is contaminated with coloring matter and certain low grades of gum rosin are more or less contaminated with the so-called latent color bodies.

As is well known both wood and gum rosin which are contaminated with coloring matter; i. e., dark colored or low grade rosin, may be refined and a light colored rosin produced by simple distillation, which is capable of effecting separation of the abietic acid or rosin content of low grade rosin from the observable or visible coloring matter, or bodies, to a large extent. However, it is equally well known that the latent color bodies contained in wood rosin and when contained in gum rosin cannot be removed by simple distillation.

Heretofore the removal of latent color bodies from wood rosin and from gum rosin containing such bodies has been effected through the treatment of the rosin with one or another substance found to have a capacity for selectively dissolving the latent color bodies and which, at the same time, may be separated from the rosin, or from the rosin in a suitable solvent, having, as it were, a capacity for selectively dissolving the rosin. Such treatment of rosin has also been found effective for the removal of observable or visible coloring matter and hence by such treatment rosin, more especially wood rosin, has been refined and rendered available for use in the production of products where lightness of color and maintenance of a light color is demanded.

In the refining of rosin for the removal of coloring matter and more especially for the removal of so-called latent color bodies, the rosin has been desirably subjected to treatment with a selective solvent for, more particularly, the latent color bodies in the form of a solution in a suitable rosin solvent, such as, for example, gasoline, or other light petroleum distillates that have a vaporizing temperature allowing removal from rosin. The selective solvent for the latent color bodies has preferentially comprised a substance, a liquid or in liquid form, having preferential affinity for the latent color bodies contained in the rosin and which, at the same time, is capable of substantial immiscibility with the solvent for the rosin, such as for example, furfural, furfuryl alcohol, aniline, a phenol, ethylene chlorohydrin, sulphur dioxide, etc.

Heretofore in carrying out the refining of rosin with the use of a selective solvent the modus operandi has involved the formation of a solution of rosin in a suitable solvent, the addition to the solution of a selective solvent for the latent color bodies or a substance having a preferential affinity for the latent color bodies and the separation from the rosin solution of the selective solvent. More particularly, the selective solvent, normally a liquid or suitably liquefied or placed in solution in a solvent capable of immiscibility with the rosin solvent, is brought into intimate contact with the rosin solution, as by violent agitation or by heating to form a homogeneous solution and separation is enabled or promoted as the case may be, by cooling the homogeneous solution produced or by cooling the mixture. The refined rosin, after separation of the selective solvent and dissolved color bodies, is recovered from the rosin solvent, for example, by evaporating off the solvent. The refining of rosin with the use of a selective solvent is more fully discussed and the modus operandi using various selective solvents is disclosed in greater detail in the patents to Irvin W. Humphrey, No. 1,715,083, dated May 28, 1929, Harry E. Kaiser and Roy S. Hancock, No. 1,715,084, dated May 28, 1929, Harry E. Kaiser and Roy S. Hancock, No. 1,715,085, dated May 28, 1929, George M. Norman, No. 1,715,087, dated May 28, 1929, Irvin W. Humphrey, No. 1,715,086, dated May 28, 1929 and Harry E. Kaiser and Roy S. Hancock, No. 1,715,088, dated May 28, 1929, to which reference is made.

Now, in accordance with this invention, there is provided a novel method and apparatus for the refining of rosin with use of a selective solvent and by which the refining of rosin may be carried on continuously with a high degree of efficiency from the standpoint of refinement of the rosin and with maximum economy in time, labor and materials.

The method embodying this invention, it will be understood, is not dependent upon the use of any particular form of apparatus though the apparatus embodying the invention will be described in connection with the description of the carrying out of the method. The method in accordance with this invention involves the formation of a solution of rosin in a suitable solvent and the admixture therewith of a selective solvent, followed by the introduction of the mixture into a body of the selective solvent used, whereby separation of the solution of rosin in its solvent from the selective solvent and the color bodies dissolved thereby will be promoted. More particularly the method involves the treatment of the separated selective solvent for the separation therefrom of color bodies including latent color bodies dissolved thereby and readmixture with the separated rosin solution followed by introduction of the mixture into a body of the selective solvent whereby separation of the selective solvent from rosin solution is promoted, the separated selective solvent being returned for admixture with further initially formed rosin solution and the separated rosin solution being suitably treated for recovery of the refined rosin, the rosin solvent being reused for dissolving rosin to be refined. Still more particularly, the method involves the formation of the initial rosin solution at an elevated temperature and cooling of the resultant of the admixture of the rosin solution with the selective solvent prior to its introduction into the body of selective solvent.

In accordance with this invention the mixture of rosin solution and selective solvent are introduced into the body of selective solvent in the form of, in effect, an emulsion. The emulsion is formed if the rosin solution, previously prepared by mixture with the selective solvent, and selective solvent are admixed at normal temperatures by virtue of more or less violent agitation. On the other hand, where the rosin solution at an elevated temperature is admixed with the selective solvent a more or less homogeneous solution may be formed, but in such case the solution is cooled, so that the homogeneous solution is destroyed and the rosin solution and selective solvent are in the form of, in effect, an emulsion, before introduction into the body of selective solvent.

Having indicated, in a general way, the nature and purpose of this invention, we will proceed to describe the method in connection with the description of the apparatus and its operation, with reference to the accompanying drawing, in which:

The figure shows diagrammatically a form of apparatus embodying this invention.

A indicates a vessel provided with a suitable mixing device in which a solution of rosin to be refined in a suitable solvent as, for example, gasoline is formed. Gasoline may be introduced into the vessel A from any suitable source, but desirably is introduced as recovered in the system; i. e., as separated from the refined rosin product of the system, through a pipe b leading from a condenser C, in which is condensed vaporized gasoline from evaporator D in which gasoline is separated from refined rosin by evaporation and from which the refined rosin passes through a pipe e to any suitable receptacle. The rosin to be refined is introduced into the vessel A, desirably in a molten condition, through a pipe f.

The rosin introduced into the vessel A may desirably be at a temperature somewhere around 275° F. at which it will be molten and at which it may be readily dissolved by the gasoline introduced into the vessel. The gasoline introduced into the vessel A from the condenser C will be normally at a temperature of about 80° F.

G represents a vessel affording a container for a supply of selective solvent as, for example, furfural, aniline, furfuryl alcohol, a chlorohydrin, a suitable phenol, etc. Desirably the vessel G is supplied with selective solvent recovered, as will hereinafter appear, after use in the refining of rosin. The vessels A and G are connected to the suction of a pump H, which desirably is a centrifugal pump. The discharge from the pump H is connected by means of a pipe $i$, which passes through a cooler J to the lower portion of a vertically positioned separator K. The lower end of the separator K is connected by the pipe $l$ with an evaporator M, which in turn is connected by pipe $n$ with a condenser O, which in turn is connected by means of suitable piping $p$ to a vessel G', a pump Q being provided for the transfer of selective solvent, withdrawn, as will appear, from the lower portion of the separator K, from condenser O to vessel G'. The upper portion of the separator K is connected with a vessel A' by means of a pipe $r$.

The vessels A' and G' are connected to the suction of a pump H', which is desirably a centrifugal pump, and which discharges through a pipe $i'$ into the lower portion of a vertically positioned separator K'.

From the lower end of the separator K' pipe $p$ affords connection with the vessel G and a pump S is provided for the transfer of selective solvent withdrawn, as will appear, from the lower portion of the separator K', to the vessel G.

The pipe $t$ connects the upper portion of the separator K' with the evaporator D heretofore referred to.

In carrying out the method in accordance with this invention with the apparatus above described, molten rosin and gasoline are introduced into vessel A and the rosin is dissolved in the gasoline in the vessel.

The rosin and gasoline are introduced in vessel A in proportion such as to form a solution containing about 15% of rosin, and in such proportion that if the rosin introduced into the vessel A is of a temperature of about 275° F. and the gasoline introduced is at a temperature of about 80° F. the resultant solution will be at a temperature of about 120° F.

A body of, for example, furfural is provided in the lower portion of the separators K and K', for example, at a level above, and preferably substantially above, the point of discharge of the pipes $i$ and $i'$. A supply of furfural is provided in the vessel G and the pump H started.

On starting of the pump H gasoline-rosin solution from the vessel A and furfural from vessel G will be drawn into the pump, thoroughly mixed thereby and, due to the temperature of the rosin solution, a more or less homogeneous solution will be formed, since at the temperature indicated 120° F. the furfural will be largely miscible with the rosin and gasoline. The mixture will be discharged by the pump through the cooler J in which its temperature will be lowered to a point such that the furfural will be relatively immiscible with the gasoline and the mixture in the form of in effect an emulsion, will be discharged into the body of furfural in the lower portion of the separator K. Discharge of the furfural-rosin solution mixture into the body of furfural will cause the rosin solution and furfural to separate, the gasoline-rosin solution floating on the furfural.

Separated gasoline-rosin solution will, when the separator becomes full, be drawn off through pipe $r$ into vessel A', while the separated furfural with color bodies in solution therein will be drawn off through pipe $l$ into evaporator M, however, at a rate such as not to lower the level of the body of furfural in the separator below the point of discharge of the pipe $i$ thereinto.

The furfural and dissolved color bodies drawn into evaporator M will be heated and the furfural separated from the color bodies by evaporation. The color bodies will be collected in the evaporator while the vaporized furfural will pass to and be condensed in condenser O and the condensed furfural transferred to vessel G' through the medium of pump Q.

The furfural in vessel G', from which it will be noted color bodies were removed in evaporator M, will together with gasoline-rosin solution from vessel A', from which the bulk of the color bodies has been removed by the furfural purified in evaporator M, will be drawn into pump H', thoroughly admixed and discharged in the form, in effect, of an emulsion into the body of furfural in the lower portion of the separator K'. As in separator K the mixture of furfural-rosin solution will separate on discharge into the body of furfural in separator K' and the rosin solution will float on the furfural. When the separator is full the separated rosin solution will flow into the evaporator D, in which the gasoline will be evaporated off from the refined rosin. The refined rosin will pass to any suitable collecting vessel and the gasoline will pass through condenser C back into vessel A. Furfural drawn from the bottom of separator K', at a rate such as not to lower the level of the furfural below the point of discharge of the pipe $i'$ will be transferred through the medium of pump S to vessel G.

It will be noted that in accordance with this invention rosin in solution in a suitable solvent is intimately contacted with a selective solvent for color bodies contained in the rosin and separation of the rosin solution from selective solvent and color bodies dissolved thereby is effected by introduction of the mixture into the body of the selective solvent. Further, it will be noted that in accordance with this invention rosin may be continuously refined, the rosin being subjected to one or more treatments with a selective solvent for the color bodies with the use of a given quantity of selective solvent and of rosin solvent, since in accordance with the invention the selective solvent after contact with the rosin solution is purified or separated from dissolved color bodies and re-contacted with the rosin solution, being then returned to contact with further rosin in solution to be refined. Further, the rosin solvent, it will be noted, after separation from the refined rosin product, is returned for the dissolving of further quantities of rosin to be refined.

It will be appreciated that in the carrying out of the method the rosin may be twice contacted with selective solvent, as described, or a single or more than two contacts may be made. Further, the selective solvent may, though such is not essential, be purified or separated from dissolved color bodies after each contact with rosin solution.

It will be noted that the method in accordance with this invention as well as the apparatus, is adaptable for continuous operation with maximum efficiency both from the standpoint of refining action and from the standpoint of economy in time, in rosin solvent and in selective solvent.

It will be understood that the method and apparatus embodying this invention lend themselves to the refining of rosin in solution where the refining is effected by treatment of the rosin with a reagent other than selective solvents for the color bodies. For example, the method and apparatus are adaptable for the continuous refining of rosin in solution where the refining is effected by treatment of the rosin solution with a reagent, as a chloride, bromide, or iodide, in solution and which will react with the color bodies to form an insoluble compound therewith. Thus, for example, the rosin in solution may be admixed with, for example, tin chloride in solution, discharged into a separator containing tin chloride in solution, separation of the two solutions and recovery being effected as above described.

The apparatus in accordance with this invention will desirably be vapor as well as liquid tight throughout and may readily be made for operation under pressure, thus not only preventing loss of selective solvent and rosin solvent, but enabling the refining of rosin with a selective solvent requiring pressure to maintain it in liquid form such, for example, as sulphur dioxide.

It will be appreciated that the carrying out of the method in accordance with this invention, while desirably carried out in the apparatus herein illustrated and described, is not dependent upon the use of any particular form of apparatus and that the apparatus herein illustrated and described may be variously modified without departing from the invention.

What we claim and desire to protect by Letters Patent is:

1. Apparatus for the refining of rosin which includes a container for a rosin solution, a container for a selective solvent for color bodies contained in rosin, a separator adapted to contain a body of the said selective solvent in said separator, a pump adapted to draw rosin solution and selective solvent from said containers and discharge them in admixture into said separator below the level of the body of selective solvent contained therein, conduits connecting said containers and separator with said pump, a container adapted to receive rosin solution from said separator, an evaporator adapted to receive selective solvent from said separator, a condenser in communication with said evaporator, a container adapted to receive selective solvent from said condenser, a second separator adapted to contain, a body of the said selective solvent in said separator and a pump adapted to draw rosin solution and selective solvent from said last mentioned containers and discharge them in admixture into said second separator below the level of the body of selective solvent contained therein and conduits connecting said last mentioned containers and separator with said last mentioned pump.

2. Apparatus for the refining of rosin which includes a container for a rosin solution, a container for a selective solvent for color bodies contained in rosin, a separator adapted to contain a body of the said selective solvent in said separator, a pump adapted to draw rosin solution and selective solvent from said containers and discharge them in admixture into said separator below the level of the body of selective solvent contained therein, conduits connecting said containers and separator with said pump, a container adapted to receive rosin solution from said separator, an evaporator adapted to receive selective solvent from said separator, a condenser in communication with said evaporator, a container adapted to receive selective solvent from said condenser, a second separator adapted to contain, a body of the said selective solvent in said separator, a pump adapted to draw rosin solution and selective solvent from said last mentioned containers and discharge them in admixture into said second separator below the level of the body of selective solvent contained therein, conduits connecting said last mentioned containers and separator with said last mentioned pump, means for transferring selective solvent from said second separator to said first mentioned container therefor, an evaporator adapted to receive rosin solution from said second separator, a condenser in communication with said evaporator, means for transferring rosin solvent from said condenser to said first mentioned container for rosin solution and means for introducing rosin into said container.

3. Apparatus for the refining of rosin, which includes a container for a rosin solution, a container for a reagent in liquid state capable of removing color bodies contained in rosin, a separator tank, a body of said reagent in the lower portion of said separator tank, a pump, conduits connecting the inlet side of said pump with said containers for rosin solution and reagent, a conduit connecting the discharge side of said pump with said separator tank at a point below the level of the body of said reagent in the lower portion of said separator tank whereby rosin solution and reagent may be drawn into said pump, admixed therein and discharged into the body of reagent adapted to be contained in said separator tank, a conduit leading from adjacent the top of said separator tank for the discharge therefrom of rosin solution and a conduit leading from the bottom of said tank for the discharge therefrom of reagent.

ROY S. HANCOCK.
ARTHUR LANGMEIER.